Patented Feb. 20, 1945

2,369,775

UNITED STATES PATENT OFFICE 2,369,775

PREPARATION OF VITAMIN B CONCENTRATES

Howard Burton Colman, Belleville, N. J., assignor to National Oil Products Company, Harrison, N. J., a corporation of New Jersey No Drawing. Application September 10, 1941, Serial No. 410,263

13 Claims. (Cl. 167—81)

This invention relates to the preparation of vitamin B concentrates, and more particularly to a novel method for the preparation of the vitamin B complex with a high yield of the active principles and a high concentration thereof in the final product.

Vitamin B concentrates are usually obtained by extracting the vitamin B complex, by means of aqueous extraction media, from source materials containing the complex, notably rice bran, rice polishings, wheat germ, and other cereal grains. Extracts thus obtained have various undesirable constituents suspended therein such as oil, carbohydrates and proteinaceous substances. It has been the practice to heat or adjust the pH value of these extracts to coagulate these undesirable constituents. In other cases a relatively small amount of ethanol has been included in the aqueous extraction media, the alcohol serving to suppress the extraction from the cereal of carbohydrates and proteinaceous substances. While these processes have experienced some commercial practice primarily for the want of a better process, the ever present demand for an increase in the efficiency of the process remains.

Accordingly, the general object of this invention is to raise both the net yield of active vitamin principles and also the concentration thereof in the final product.

Other objects of the invention will in part be obvious and will in part appear hereinafter.

The above and other objects are achieved by the process of this invention, which comprises extracting out the fatty substances from a vitamin B source material, such as rice bran or other cereal, yeast, etc. by means of a water-miscible fat solvent; removing the major portion of such solvent from the material, leaving the bran wet with the remaining solvent; thereafter treating and extracting the material while still wet with solvent, with an aqueous extractant, the residual solvent dissolving in the extractant and when so dissolved acting to suppress extraction of inert substances while permitting the extraction of the vitamin B complex; and finally, removing the aqueous extractant and evaporating the same to produce a vitamin B concentrate of high potency.

The invention accordingly comprises the several steps and the relation of one or more of such steps with respect to each of the others thereof, which will be exemplified in the process hereinafter disclosed, and the scope of the invention will be indicated in the claims.

The process of the invention is applicable for the extraction of any natural vitamin B source material. Generally speaking, such materials include, among others, yeast and the vitamin B-containing cereals, such as rice bran, rice polishings, wheat germ, maize germ, wheat bran, etc.

In carrying out the process of the invention, the use of isopropanol as the extracting solvent is highly preferred, but any water-miscible lower alcohol, such as ethanol, n-propanol, tertiary butyl alcohol; or lower ketones, such as acetone, diethyl ketone, or methyl ethyl ketone, or in general, since purely physical action is involved, any water-miscible fat solvent or mixture thereof may be used. In using the preferred solvent, i. e. isopropanol, according to the process of the invention, the concentration thereof may be within the range of 91% to 100%. It is preferred, however, to employ isopropanol containing less than 4% moisture as the moisture content directly affects the fat solvent power of the solvent. Moreover, if the moisture content of the solvent is too high, some of the B-complex will be extracted out, particularly at elevated temperatures.

Both the fat extraction and aqueous extraction steps are preferably conducted at least in part with counter-current flow of source materials and extractant; however, it may be desirable in some cases to conduct at least a portion of each extraction without forwarding the extractant, as for instance, in the last stage of each extraction. The temperature at which the fat extraction should be carried out will vary, but for best results it should range between about 30° C. and about 70° C. The concentration, in the aqueous extraction medium, of isopropanol or other water-miscible fat extractants and suppressors of inert materials extraction will range between about 10% and 70%, preferably between about 18% and about 45%.

In the process as above described, reliance is placed on the fat solvent entrained within the source material to furnish the component required to suppress extraction of the carbohydrate and protein material and to prevent bacterial action with consequent diminution of vitamin activity, but it may be advantageous to incorporate additional quantities of the solvent or suppressing components into the aqueous extractant, which additional quantities may conveniently be the same water-miscible fat solvent used in the fat extraction. The aqueous extractant should contain at least 10% solvent and in many cases the solvent may run as high as 70%. Best results have been obtained when the aqueous extractant has contained an amount of solvent falling within the range of 18% to 45%.

Following are detailed examples illustrative of the present invention, and also, for comparison, of the prior art. All parts are given by weight.

Example I 100 parts of rice bran containing 7.5 international units of vitamin $B_1$ per gram were mixed and agitated with 300 parts of isopropanol (99% by volume), and the isopropanol was thereafter filtered off. The residual rice bran was again mixed and agitated with 300 additional parts of isopropanol and the isopropanol filtered off. Sufficient water and isopropanol were added to the residual bran, which was still wet with entrained isopropanol not removed by the filtration, to form, together with the entrained isopropanol, 300 parts of an aqueous solution containing 40% isopropanol. This solution and the bran were thoroughly mixed and agitated, and the solution filtered off. The residual bran and 300 parts of a 40% aqueous solution of isopropanol were mixed, the mixture thoroughly agitated, and the solution filtered off. The residual bran was again treated in the same way. All the aqueous solutions were combined and the water and isopropanol evaporated off under vacuum until the density of the solution was 1.35. This solution was a highly potent concentrate of the vitamin B complex, containing 46 units of vitamin $B_1$ per gram. The concentrate contained 63.3% of all the vitamin $B_1$ associated with the original bran.

Example II 100 parts of rice bran containing 8.1 international units of vitamin $B_1$ per gram were mixed and agitated with 250 parts of isopropanol (99% by volume), and the isopropanol was thereafter filtered off. The residual rice bran was twice again extracted in exactly the same way with successive 250 part portions of isopropanol. Sufficient water and isopropanol were added to the residual rice bran, which was still wet with the entrained isopropanol not removed by the filtration, to form, with this entrained isopropanol, 280 parts of an aqueous solution containing 40% isopropanol. 1 part of 96% sulfuric acid was added, the solution and bran were thoroughly mixed and agitated, and the solution filtered off. The residual bran and 280 parts of an aqueous solution containing 40% isopropanol and 3% sulfuric acid were mixed and agitated, and the solution filtered off. The two aqueous solutions were combined and evaporated under vacuum to a density of 1.30. This solution was a highly potent concentrate of the vitamin B complex, containing 46 units of vitamin $B_1$ per gram. The concentrate contained 61% of all the vitamin $B_1$ associated with the original bran.

Example III 100 parts of rice bran containing 6.8 units of vitamin $B_1$ per gram were extracted with two successive 300 part portions of acetone (99.5% by volume) which were filtered off after the extractions. Sufficient water and acetone were added to form, together with the entrained acetone left in the bran by the filtration, 230 parts of an aqueous solution containing 20% acetone. The resultant slurry of bran in 20% acetone was mixed and thoroughly agitated, and the aqueous solution filtered off. The residual bran was twice again mixed and agitated with 230 part portions of aqueous solutions containing 20% acetone, the solutions being filtered off after each extraction. All the aqueous solutions were combined and evaporated down under vacuum to a density of 1.4. The resulting solution was a highly potent vitamin B concentrate containing 27 international units of vitamin $B_1$ per gram. This concentrate contained 45% of all the vitamin $B_1$ associated with the original bran.

Example IV 100 grams of rice bran containing 6.8 international units of vitamin $B_1$ per gram were extracted twice with successive 300 part portions of 100% dioxane. Sufficient water was added to the bran, still wet with entrained dioxane left by the filtration, to form with the entrained dioxane 290 parts of an aqueous solution containing 20% dioxane. The resulting slurry was thoroughly mixed and agitated, and the solution filtered off. The residual bran was thereafter agitated and extracted with two successive 280 part portions of aqueous solutions containing 20% dioxane, which portions were filtered off after the respective extractions. All the aqueous solutions were combined and concentrated under vacuum to a density of about 1.37. The resultant syrup was a concentrate of vitamin B containing 17 international units of vitamin $B_1$ per gram. The concentrate contained 37% of the vitamin $B_1$ associated with the original bran used.

Example V 100 grams of wheat bran containing 3.2 units of vitamin $B_1$ per gram were extracted twice with successive 350 part portions of isopropanol (99% by volume). Sufficient water and isopropanol were added to the wet bran, to form, with the entrained isopropanol, 500 parts of an aqueous extractant solution containing 20% of isopropanol. The resultant slurry was thoroughly mixed and agitated, and the aqueous extractant solution filtered off. The residual bran was twice extracted with successive 500 part portions of aqueous extractant solutions containing 20% isopropanol. All the aqueous extractant solutions were combined, refiltered and concentrated under vacuum to a syrup having a density of 1.37 and containing 14 international units of vitamin $B_1$ per gram. This concentrate contained 56% of the vitamin $B_1$ associated with the original bran used.

Example VI (To be distinguished from the present invention)

200 parts of rice bran and 9.7 international units of vitamin $B_1$ per gram were extracted three times with 600 parts of 20% ethanol. The combined extracts were filtered and concentrated to yield 31.7 parts of a thick syrup having a specific gravity of 1.37, and containing 27.5 international units of vitamin $B_1$ per gram and 45% of the vitamin $B_1$ present in the original rice bran. This syrup was very muddy in appearance and had a characteristic grainy odor and taste. In order to make this suitable for human consumption it was found necessary to take the material up in 90 parts of 50% ethanol and filter out the starch, gums and proteins that were precipitated. The filtered solution was evaporated down to a specific gravity of 1.37, yielding 18.6 grams of a material containing 31.2 international units of vitamin $B_1$ per gram and containing 30.2% of the vitamin $B_1$ present in the original bran.

From the foregoing it will be seen that there has been provided by this invention a process whereby higher yields and higher potencies of vitamin B concentrates can be prepared than is possible with the heretofore known procedures. For example, comparing Example VI, which is fairly representative of prior practice, with Example I of the present invention: In Example VI only 30.2% of the vitamin $B_1$ is recovered, and a concentration of only 31.2 international units of vitamin $B_1$ is attained, as against a 63% yield and 46 unit concentration obtained in accordance with the applicant's invention as depicted in Example I.

Since certain changes may be made in carrying out the above process without departing from the scope of the invention, it is intended that all matter contained in the above description shall be interpreted as illustrative, and not in a limiting sense.

Having described my invention, what I claim as new and desire to secure by Letters Patent, is:

1. A process of producing a concentrate high in vitamin B from fatty vitamin B source materials, which comprises defatting the material by extraction with a water-miscible fat solvent and extracting the defatted material with an aqueous solution of a water-miscible fat solvent.

2. A process of producing a concentrate high in vitamin B from fatty vitamin B source materials, which comprises defatting the material by extraction with a water-miscible fat solvent and extracting the defatted material with an aqueous solution of isopropanol.

3. A process of producing a concentrate high in vitamin B from cereals, which comprises defatting the cereal by extraction with a water-miscible fat solvent and extracting the defatted cereal with an aqueous solution of a water-miscible fat solvent.

4. A process of producing a concentrate high in vitamin B from rice bran, which comprises defatting the rice bran by extraction with a water-miscible fat solvent and extracting the defatted rice bran with an aqueous solution of a water-miscible fat solvent.

5. A process of producing a concentrate high in vitamin B from rice polishings, which comprises defatting the rice polishings by extraction with a water-miscible fat solvent and extracting the defatted rice polishings with an aqueous solution of a water-miscible fat solvent.

6. A process of producing a concentrate high in vitamin B from wheat germ, which comprises defatting the wheat germ by extraction with a water-miscible fat solvent and extracting the defatted wheat germ with an aqueous solution of a water-miscible fat solvent.

7. A process of producing a concentrate high in vitamin B from cereals, which comprises defatting the cereal by extraction with isopropanol and extracting the defatted cereal with an aqueous solution of a water-miscible fat solvent.

8. A process of producing a concentrate high in vitamin B from rice bran, which comprises defatting the rice bran by extraction with isopropanol and extracting the defatted rice bran with an aqueous solution of a water-miscible fat solvent.

9. A process of producing a concentrate high in vitamin B from rice polishings, which comprises defatting the rice polishings by extraction with isopropanol and extracting the defatted rice polishings with an aqueous solution of a water-miscible fat solvent.

10. A process of producing a concentrate high in vitamin B from cereals, which comprises defatting the cereal by extraction with isopropanol containing less than 4% moisture and extracting the defatted cereal with an aqueous solution containing 18% to 45% of a water-miscible fat solvent.

11. A process of producing a concentrate high in vitamin B from rice bran, which comprises defatting the rice bran by extraction with isopropanol containing less than 4% moisture and extracting the defatted rice bran with an aqueous solution containing 18% to 45% of a water-miscible fat solvent.

12. A process of producing a concentrate high in vitamin B from rice polishings, which comprises defatting the rice polishings by extraction with isopropanol containing less than 4% moisture and extracting the defatted rice polishings with an aqueous solution containing 18% to 45% of a water-miscible fat solvent.

13. A process of producing a concentrate high in vitamin B from rice bran, which comprises defatting the rice bran by extraction with isopropanol containing less than 4% moisture and extracting the defatted rice bran with an aqueous solution containing 18% to 45% isopropanol.

HOWARD BURTON COLMAN.